United States Patent
Jörn et al.

(10) Patent No.: US 10,427,358 B2
(45) Date of Patent: Oct. 1, 2019

(54) METHOD FOR MANUFACTURING A RIVET CONNECTION OF A FIBER COMPOSITE COMPONENT

(71) Applicant: AIRBUS OPERATIONS GMBH, Hamburg (DE)

(72) Inventors: Paul Jörn, Hamburg (DE); Peter Linde, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/604,277

(22) Filed: May 24, 2017

(65) Prior Publication Data

US 2017/0355151 A1 Dec. 14, 2017

(30) Foreign Application Priority Data

Jun. 8, 2016 (DE) .................. 10 2016 210 115

(51) Int. Cl.
*B29C 65/60* (2006.01)
*B29C 35/08* (2006.01)
*B29C 65/00* (2006.01)
*B32B 5/10* (2006.01)
*B32B 7/08* (2019.01)
*B32B 27/08* (2006.01)
(Continued)

(52) U.S. Cl.
CPC .......... *B29C 65/60* (2013.01); *B29C 35/0805* (2013.01); *B29C 65/601* (2013.01); *B29C 66/0246* (2013.01); *B29C 66/1122* (2013.01); *B29C 66/1142* (2013.01); *B29C 66/21* (2013.01); *B29C 66/54* (2013.01); *B29C 66/73921* (2013.01); *B29C 66/73941* (2013.01); *B32B 5/10* (2013.01); *B32B 7/08* (2013.01); *B32B 27/08* (2013.01); *B29C 66/7212* (2013.01); *B29C 2035/0838* (2013.01); *B29K 2105/06* (2013.01); *B29K 2105/256* (2013.01); *B29K 2307/04* (2013.01); *B29L 2031/30* (2013.01); *B29L 2031/3082* (2013.01); *B32B 2262/106* (2013.01); *B32B 2605/00* (2013.01)

(58) Field of Classification Search
CPC ....................................... B29C 65/60
USPC ........................................... 428/57
See application file for complete search history.

(56) References Cited

U.S. PATENT DOCUMENTS

2015/0367424 A1 12/2015 Obermeier et al.

FOREIGN PATENT DOCUMENTS

| DE | 10 2011 120 670 A1 | 7/2012 | |
| DE | 102011120670 A1 * | 7/2012 | ........... B23K 26/382 |
| DE | 10 2014 211 689 A1 | 12/2015 | |

OTHER PUBLICATIONS

Translation of DE102011120670 (A1) (Goth et al.), 2012 (Year: 2012).*

(Continued)

Primary Examiner — Brent T O'Hern
(74) Attorney, Agent, or Firm — Jenkins, Wilson, Taylor & Hunt, P.A.

(57) ABSTRACT

A method for manufacturing a rivet connection of a fiber composite component. The method includes positioning a first component which contains a fiber composite material in an overlap joint with a second component, laser-drilling a shared through-hole at least through the fiber composite material of the first component, inserting a rivet into the through-hole and fixing the rivet to the first and to the second component.

17 Claims, 4 Drawing Sheets

(51) Int. Cl.
    *B29K 105/06*     (2006.01)
    *B29K 105/00*     (2006.01)
    *B29K 307/04*     (2006.01)
    *B29L 31/30*     (2006.01)

(56) References Cited

OTHER PUBLICATIONS

German Search Report for Application No. 102016210115 dated Jan. 2, 2017.

\* cited by examiner

METHOD FOR MANUFACTURING A RIVET CONNECTION OF A FIBER COMPOSITE COMPONENT

CROSS-REFERENCE TO RELATED APPLICATION

This application claims priority to German Patent Application DE 10 2016 210 115.3 filed Jun. 8, 2016, the entire disclosure of which is incorporated by reference herein.

TECHNICAL FIELD

The present disclosure relates to a method for manufacturing a rivet connection of a fiber composite component, to a use of a laser-drilling process to manufacture a rivet connection of a fiber composite component, to a structural arrangement comprising a rivet connection of this type, to a method for manufacturing a vehicle skin and to a vehicle skin.

Although they are applicable to any structural arrangements, the present disclosure and the set of problems on which it is based are described in greater detail in relation to an airplane fuselage.

BACKGROUND

Modern airplane fuselages are often constructed using fiber composite materials, generally carbon-fiber-reinforced plastics materials. An airplane fuselage conventionally comprises a plurality of skin portions which are interconnected to assemble the airplane fuselage. To fix the skin portions together, riveting methods are conventionally used, this often being required for certification or authorisation.

To manufacture a rivet connection for connecting two carbon-fiber-reinforced plastics material skin portions, in a method known to the applicant through-holes are introduced to the skin portions using a manually positioned drilling template and a hand-operated power drill.

SUMMARY

Against this background, it is an idea of the present disclosure to provide an improved method for manufacturing a rivet connection of a fiber composite component.

Accordingly, the following are provided:

A method for manufacturing a rivet connection of a fiber composite component, comprising steps of: positioning a first component which contains a fiber composite material in an overlap joint with a second component; laser-drilling a shared through-hole at least through the fiber composite material of the first component; inserting a rivet into the through-hole; and fixing the rivet to the first and to the second component.

A structural arrangement comprising a first component which contains a fiber composite material and a second component, the first and the second component being connected using a rivet connection manufactured by a method according to the disclosure herein.

A method for manufacturing a vehicle skin, in particular for an aircraft or spacecraft, comprising the steps of: providing a first component in the form of a first skin portion which contains a fiber composite material; providing a second component, in particular in the form of a second skin portion or a connecting portion for connecting the first skin portion to a second skin portion in a butt joint; and connecting the first component to the second component using a rivet connection manufactured by a method according to the disclosure herein.

A vehicle skin, in particular of an aircraft or spacecraft, manufactured by a method according to the disclosure herein.

A use of a laser-drilling process to manufacture a rivet connection of a fiber composite component, in particular by a method according to the disclosure herein.

An idea behind the present disclosure is to use a laser-drilling process to manufacture a rivet connection of a fiber composite component.

In this way, the very fine, very easily accumulating drilling dust which occurs during conventional drilling of fiber composite components can be prevented, since the fiber composite material is evaporated rather than cut during laser-drilling.

For this purpose, the light energy of the laser beam focussed on the material is absorbed by the fiber composite material, in other words converted into heat, in such a way that the material evaporates without dust occurring. During the evaporation, the material volume in the drill hole expands, in such a way that high vapor pressure occurs locally. This vapor pressure subsequently also drives any molten material out of the drill hole.

It is also possible to laser-drill by way of laser-machining using ultrashort pulse lasers, in such a way that the material evaporates directly from the solid state, in particular without melting, and is thus removed. This process is also referred to as laser ablation.

Thus, according to the disclosure herein, it is possible to omit the cleaning step which has thus far been required for manufacturing a rivet connection of a fiber composite component because of the drilling dust which occurs. Further, the machining time for manufacturing a rivet connection is greatly reduced.

According to the disclosure herein, different types of laser-drilling processes may be used.

The simplest type of laser-drilling is single-pulse drilling, in which the material is drilled through using a single, sufficiently temporally long laser pulse.

In percussion drilling, the material is removed by the impingement of a plurality of pulses in succession on the same point.

By contrast, in laser-drilling by trepanning, the laser beam is passed around the centre of the drill hole, and thus successively widens the diameter. A smaller through-hole can be produced beforehand by percussion drilling.

In spiral drilling, a laser beam is directed onto the workpiece whilst rotating in a circle. After a few circuits, the circular material removal forms a through-hole.

In laser-drilling, each of these options is a very rapid process by comparison with conventional drilling, and takes only a fraction of the time, in particular just fractions of a second. In addition, the energy consumption per hole drilled can also be reduced in this way.

Further, laser-drilling is can also be automated or at least partially automated better, since the through-holes can be positioned and reproduced with a very high accuracy of repetition.

In the case of complete automation, the step of positioning a drilling template can be omitted.

In the case of partial automation, in other words if the laser tool or laser optics are positioned under the control of an operator, a drilling template may further be provided as a positioning aid. For example, by a search laser, the laser optics can be oriented onto the hole provided in the drilling template and thus positioned for the laser-drilling.

Alternatively or additionally, the drilling template may be arranged stationary, in such a way that the components to be connected can be oriented on the drilling template in the desired position. In this case, a plurality of adjacent holes can be drilled in an automated manner after the orientation.

In one embodiment, it is conceivable to provide the second component with pre-drilled holes, in such a way that the shared through-hole can only be produced through the fiber composite material of the first component by laser-drilling. In particular holes pre-drilled in this manner in the second component may comprise depressions for receiving a rivet head in a flush manner.

In further embodiments, both the first component and the second component are drilled through during laser-drilling. In this case, a shared through-hole is laser-drilled through the fiber composite material of the first component and through the second component.

Laser beam optics are generally guided using a robot, in particular an industrial robot. In this way, the laser beam can be oriented.

Further, there are also movable laser beam optics known as scanners which make it possible to orientate and guide the laser beam by beam deflection. In particular, this also makes laser-machining possible "on the fly", in other words without halting the robot carrying the optics, and this can further reduce the machining time.

By the increased level of automation, according to the disclosure herein the (human) working time required for manufacture can be massively reduced, as well as the manufacturing time. This effect may have enormous potential for example in airplane manufacture, in which millions of rivets are placed every year.

The high reproducibility according to the disclosure herein is because unlike a drill the laser beam can operate without wear. Thus, in laser-drilling, even for large numbers of holes, no deviation in the hole geometry and no worsening of the hole wall, in particular no increase in roughness, are observed.

Further, the method according to the disclosure herein may also be used flexibly for different types of composite materials. In particular, it may equally be used both for components containing composite materials having a thermoplastic matrix and for components containing composite materials having a thermoset matrix.

The method according to the disclosure herein can therefore be used for manufacturing a wide range of structural arrangements comprising rivet connections, for example both for a wide range of skin portions of an airplane, such as on the fuselage, the wings or the like, and for example for fiber composite material skin portions on land vehicles or boats. Further, use of the method according to the disclosure herein to connect a skin portion to other types of structural parts, for example to connecting or stabilizing elements, known as clips or cleats, or directly to stringers and/or formers is also conceivable.

The second component, as a joining partner of the first component which contains a fiber composite material, may comprise an identical or different material.

The shared through-hole through the first and second components may be manufactured in a shared manufacturing step by laser-drilling. In this way, the complexity of positioning is kept to a minimum.

However, it is also conceivable to manufacture the shared through-hole in two separate steps or in a two-step process by laser-drilling. This may for example be advantageous if the components comprise different materials and the laser-drilling thus requires different process parameters. In this case, the components may therefore be positioned in an overlap joint either before or only after the shared through-hole is laser-drilled, naturally coincidently with the shared through-hole.

In another development, the laser-drilling is carried out using a high-energy laser beam. In this case, the intensity of the laser beam is in a range which makes it possible to evaporate both the matrix material and the fibers of the fiber composite material.

In particular, this is a laser beam having a laser power in the kilowatt range. For this purpose, in particular solid-state lasers, for example a disc laser (for example Nd:YAG: neodymium-doped yttrium aluminium garnet) or fiber laser (for example an ytterbium fiber laser), are conceivable. Use of a high-power gas laser, in particular a $CO_2$ laser, would also be conceivable.

In particular, this may be a high-brilliance laser beam. The brilliance is generally the characteristic value for the beam quality. At high brilliance, high beam intensities are possible, in other words beams having particularly high energy per area, and this advantageously leads to a high proportion of sublimated material. Further, this is possible in a comparatively large region of the beam path around the focal position of the laser beam. For example, a high brilliance can be achieved using an ytterbium fiber laser.

In one embodiment, the second component likewise contains a fiber composite material. This is also drilled through during the laser-drilling. Thus, the two fiber composite components are provided with a shared through-hole. In particular, this is carried out in a shared step in the overlap joint. In this way, in particular a fiber composite construction of a structural arrangement comprising a rivet connection can be manufactured rapidly and without dust.

In one embodiment, the fiber composite material comprises carbon fibers, some of which are drilled through by the laser-drilling. Advantageously, according to the disclosure herein this is implemented without the occurrence of carbon dust or without carbon dust. In particular, the fiber composite material is carbon-fiber-reinforced plastics material. Both thermoplastic and thermosetting plastics materials are conceivable as matrix materials.

In one embodiment, a laser beam for laser-drilling is widened or defocussed in a manner adapted to a desired hole diameter. In particular, the widening or defocussing is also adapted during laser-drilling as a function of the hole depth reached. Thus, different diameters and hole shapes of the through-hole can be implemented, in particular diameters of a few millimeters typically provided for rivets. The intensity of the laser beam remains in a range which makes it possible to evaporate both the matrix material and the fibers of the fiber composite material.

In another development, the laser beam is initially more heavily widened or defocussed, and subsequently less and less so down to the desired hole diameter, to form a conical entry to the through-hole which is formed for countersinking a rivet head. In particular, this is adapted to the geometry of the rivet in a predetermined manner as a function of the achieved hole depth. Thus, advantageously, no post-processing for counter-sinking a rivet head is required at the entry to the through-hole.

In one embodiment, at least the first component is provided in planar form. Optionally or additionally, a multiplicity of shared through-holes of the first component and second component are formed by laser-drilling in a line extending along an edge of the first component. To form a joint line, subsequently a rivet is inserted into each of the through-holes and fixed to the first and the second component. In particular, the holes are placed at uniform distances, in such a way that a uniformly continuous joint line is manufactured. In this way, advantageously, planar components, for example skin portions, can be joined in a comparatively simple and rapid manner using a rivet connection.

In another development, a plurality of parallel joint lines are provided along the edge of the first component. In this way, redundancy in the rivet connection is provided, in such a way that a higher support loading capacity and a higher strength are achieved. In addition, as a result of the multiple connection, the rigidity of the structural arrangement created by the rivet connections is also increased. In particular, a structural arrangement for example of an aircraft or spacecraft is typically a rivet connection comprising three joint lines, as is conventional for aviation.

In another embodiment of a structural arrangement, a through-hole of the rivet connection comprises a hole wall which comprises a surface manufactured without cutting. The hole wall manufactured by laser-drilling is in particular free of grooves normally brought about by cutting tools or conventional drills. Further, the constitution of the hole wall is also different from in etched holes, since in composite materials etching always brings about a different surface structure on the different materials. In particular, the hole wall manufactured by laser-drilling may instead be covered with material directly solidified from a molten liquid state. This is material melted by the laser beam which has been left behind on the cavity wall when the melt was driven out or has been melted on during the evaporation. Alternatively, the surface may also be manufactured by direct evaporation. This surface structure of the hole wall is therefore clearly distinguishable by conventional analysis methods, for example under a microscope, from a conventionally drilled hole wall, which usually has machining traces and/or a certain roughness and/or drilling dust.

In another embodiment of a use, the laser-drilling process for manufacturing a rivet connection of a vehicle skin by a method according to the disclosure herein is used. In particular, the vehicle skin is the skin, for example the fuselage, of an aircraft or spacecraft. However, the method according to the disclosure herein is also usable in other skin portions of an aircraft or spacecraft, for example the skin of a wing. Further, the method according to the disclosure herein is also usable in the manufacture of a vehicle skin for other types of vehicles, for example motor vehicles or boats.

The above embodiments and developments can be combined with one another as desired, within reason. In particular, all features of the method for manufacturing the rivet connection are also transferable to a structural arrangement comprising a rivet connection of this type and vice versa. The same applies to a method for manufacturing a vehicle skin and to a vehicle skin.

Further possible embodiments, developments and implementations of the disclosure herein also comprise combinations not explicitly mentioned of features of the disclosure herein which are disclosed above or in the following in relation to the embodiments. In particular, in this context a person skilled in the art will also add individual aspects to each basic form of the present disclosure as improvements or supplements.

BRIEF DESCRIPTION OF THE DRAWINGS

In the following, the disclosure herein is described in greater detail by way of embodiments with reference to the accompanying example drawings.

In the drawings.

In the drawings, unless stated otherwise, like reference numerals denoted like or functionally equivalent components. The drawings are not necessarily to scale with one another.

DETAILED DESCRIPTION

Figure 1:
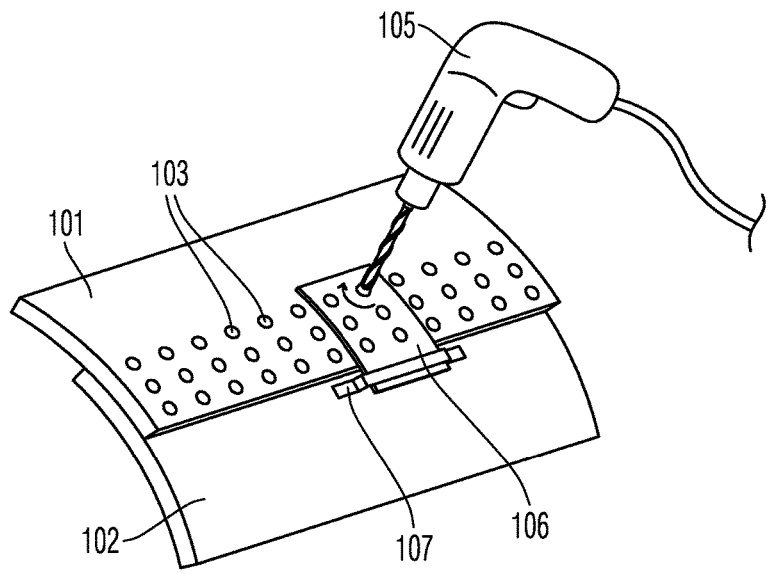
FIG. 1 is a perspective view of an example of manufacturing through-holes for rivet connections.

FIG. 1 is a perspective view of an example of manufacturing through-holes 103 for rivet connections.

The components to be connected are two skin portions 101 and 102 of a fiber composite material airplane fuselage. To manufacture the through-holes 103, a drilling template 106 is manually positioned and fixed, for example by an adhesive strip 107 as shown. Subsequently, a through-hole 103 is drilled in the skin portions 101, 102 using a hand-operated power drill 105.

Figure 2A:
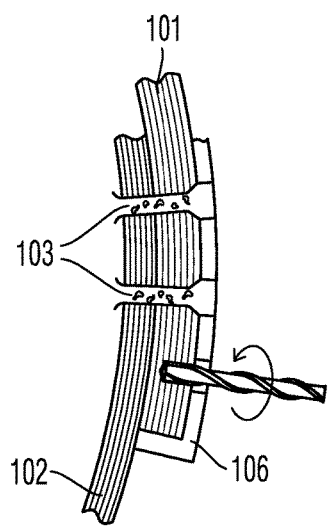
FIG. 2A-2C are cross-sectional drawings of the typical steps for manufacturing a rivet connection for connecting two skin portions.
Figure 2B:
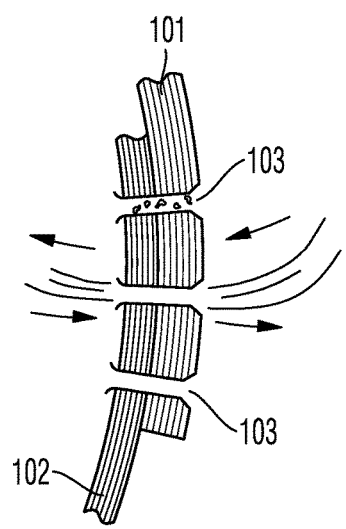
Figure 2C:
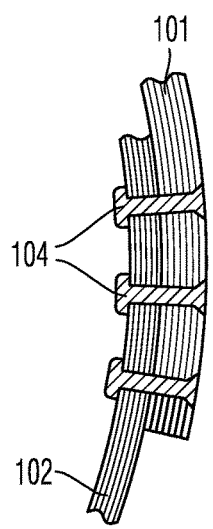

FIG. 2A-2C are cross-sectional drawings of the typical steps for manufacturing a rivet connection for connecting two skin portions 101, 102.

In a first step in accordance with FIG. 2A, through-holes 103 are drilled in an overlap region of the fiber composite material skin portions 101, 102 in the manner described in FIG. 1, by mechanical cutting using a hand-operated power drill at a position specified using a drilling template 106.

In a second step in accordance with FIG. 2B, the through-holes 103 are cleaned of drilling dust and residues. This takes place for example by pressurised air from both sides, as is indicated schematically using flow lines and directional arrows. This cleaning step is important when fiber composite materials are machined using a conventional drill, since very fine carbon dust occurs when the material is cut and easily accumulates in the hole 103.

In a third step in accordance with FIG. 2C, rivets 104 are introduced into the through-holes 103 by a riveting tool (not shown) and fixed to the two skin portions 101, 102 by deforming the rivet.

Figure 3A:
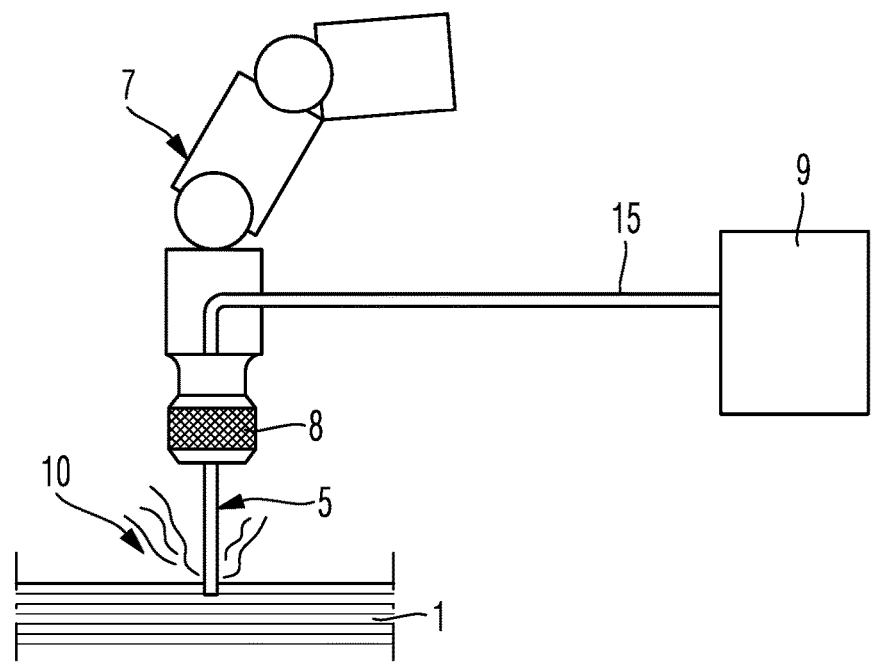
FIG. 3A shows an arrangement for laser-drilling a fiber composite component.

FIG. 3A shows an arrangement for laser drilling a fiber composite component.

By way of example, a first component 1 made of carbon-fiber-reinforced plastics material is provided as the fiber composite component.

The arrangement comprises laser optics 8, which are carried and positioned by a robot 7. The robot 7 may for example be a conventional industrial robot having a suitable mounting.

The laser optics 8 are supplied with laser radiation from a laser source 9 via an optical fiber 15. For example, the laser source 9 is a high-energy solid-state laser, in particular a disc laser or fiber laser, having a laser power in the kilowatt range.

Preferably, a laser beam 5 generated thereby has a high brilliance. The brilliance B is defined as the quotient of the laser power $P_L$ divided by the product of the beam quality factor $M^2$ and the wavelength $\lambda$ of the laser beam. The beam quality factor $M^2$ denotes the degree of divergence of the beam path. It is known in principle to a person skilled in the art how to derive the beam quality factor for transverse electromagnetic modes ($TEM_{mn}$), and so a theoretical explanation is omitted herein. The brilliance which can be calculated in this manner is a measure of the quality of the laser beam. In practice, the beam parameter product (BPP), based on the beam quality factor $M^2$ in terms of calculation, is often given in connection with the laser power $P_L$ so as to express the beam quality.

The laser optics are positioned above a first fiber composite material component 1 to be drilled through by a robot 7 in such a way that the focal position of the laser beam 5 is at the level of the first component 1. In the theoretical ideal case, the laser beam can be focussed to a minimum diameter corresponding to the fiber diameter of the optical fiber 15.

To drill through the first component 1, a multiplicity of laser pulses are emitted onto the first component, for example by percussion drilling, in such a way that the material of the first component 1 evaporates, the laser beam 5 digs further into the first component 1, and material vapor 10 escapes from the resulting hole. This is repeated until a through-hole is manufactured.

The laser beam 5 evaporates both the matrix material and the fiber material of the fiber composite material equally. In particular, in the case of carbon-fiber-reinforced plastics materials, the laser beam evaporates both the plastics material matrix and the carbon fibers in the region of the through-hole.

Because of the different thermophysical properties of the fibers and the matrix material, particular constraints should be adhered to when laser-drilling fiber composite materials. In particular in carbon-fiber-reinforced plastics materials, care should be taken that the temperatures within the component do not exceed material-dependent thresholds in the environment of the through-hole to be manufactured as a result of thermal conduction along the carbon fibers. Thresholds of this type may for example be the glass transition temperature and the evaporation temperature, and in the case of thermoplastic systems the melting point of the matrix.

It is therefore advantageous to aim for a high degree of sublimation or ablation. The intensity of the laser beam is selected to be appropriately high so as to be able to evaporate both the matrix material and the fibers of the fiber composite material.

So as to achieve a desired diameter of the through-hole, for example a through-hole manufactured by percussive drilling can be widened by trepanning, in other words moving the component or the laser optics in a circle around the centre of the through-hole.

Alternatively or additionally, a spiral drilling process may be used or carried out to drill through the first component 1. In this process, depending on the type of construction, the laser beam (for example using movable mirror optics, known as a scanner) or the laser beam optics (by moving the robot accordingly) or the first component (by moving a mounting accordingly) constantly rotates around the centre of the through-hole to be manufactured, in such a way that a hole having the desired diameter is produced directly. Superposed movements are also conceivable, in particular in the case of a scanner provided as laser optics and mounted on the robot.

An alternative to laser-drilling involves directing a high-energy laser beam having sufficiently high laser power, for example a $CO_2$ laser, a fiber laser or a disc laser, for example having a power >3 kW, in particular >6 kW, onto the first component 1 in a configuration in which a beam diameter directly corresponds to the desired diameter of the through-hole. This is the case in FIG. 3A, and can be achieved by way of appropriately configured laser optics 8 having an appropriate imaging ratio, by optically defocussing the laser beam 5, by adjusting a relevant distance from the focal position and/or by way of an appropriately thick diameter of an optical fiber from the laser source to the laser optics. Because of the high power, the intensity of the laser beam 5 is still high enough to evaporate the material both of the matrix and of the fibers of the fiber composite material.

In this way, by single-pulse or percussive drilling, by which the laser beam works into the fiber composite material, a through-hole can be produced directly at the desired diameter.

Naturally, these drilling process are merely examples of a possible implementation. Further drilling strategies or drilling processes are also possible.

In particular, a continuous laser may be used as a laser source. However, a pulsed laser would also be conceivable.

Figure 3B:
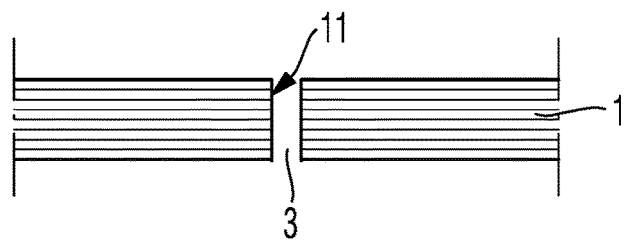
FIG. 3B is a cross-sectional view of a fiber composite material component drilled through by laser-drilling.

FIG. 3B is a cross-sectional view of a fiber composite material component drilled through by laser-drilling.

This first component 1 accordingly comprises a through-hole 3. The hole wall 11, manufactured by laser-drilling, of the through-hole 3 is a completely smooth and clean surface without residues of the drilling dust. It is in particular a surface which is covered with material directly solidified from the molten liquid state or which is manufactured by direct evaporation.

The material melted on by the laser beam 5 has for example been left behind on the hole wall 11 when the melt was driven out or been melted on during the laser-drilling.

Figure 4A:
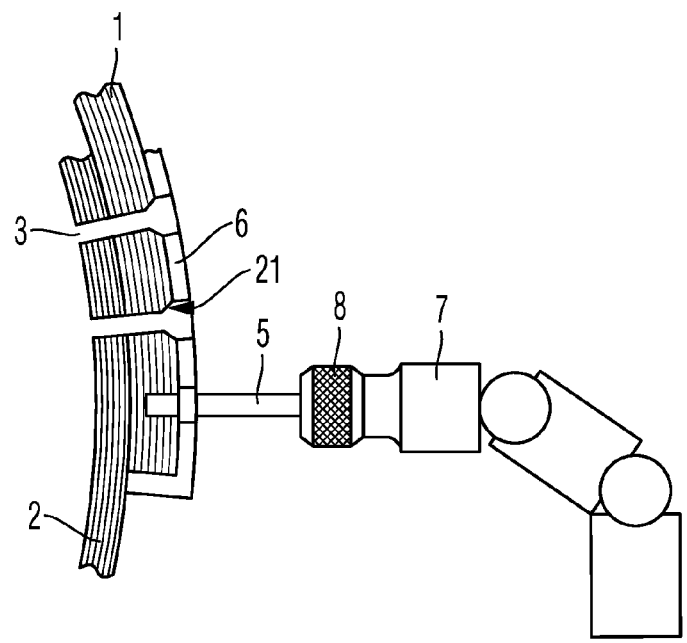
FIG. 4A shows an arrangement for drilling through two fiber composite material components in an overlap joint.

FIG. 4A shows an arrangement for drilling through two fiber composite material components 1, 2 in an overlap joint.

The two components 1, 2 arranged in an overlap joint consist of or comprise for example carbon-fiber reinforced plastics material and are occupied by a drilling template 6, for positioning or orientating the laser optics 8, on a face provided for the entry of the laser beam 5.

As explained in relation to FIG. 3A, the laser optics 8 are mounted on a robot 7. The associated laser source 9 and the optical fiber 15, which supply the laser optics, are not shown here for improved clarity.

The embodiment shown is in particular a semi-automatic system. In other words, the laser optics 8 are oriented onto recesses provided in the drilling template 6, in a robot-assisted manner but under the control of a user. For this purpose, the laser source 9 comprises a search laser which emits a visible light beam through the fiber in such a way that a light point is projected onto the targeted point by the laser optics.

Alternatively, the drilling template 6 may also be fixed in position and be formed as a positioning means or stop for the first and second components 1, 2. In this case, the approach towards the positions for drilling may be programmed or saved (for example by learning or teaching) into a control system of the robot 7.

Further, a laser machining pattern or a machining sequence may be programmed into a control system of the laser source 9 and/or of the laser optics 8.

After the components 1, 2 and/or the drilling template 6 have been positioned, an automatic sequence of the drilling process can be initiated.

As a further alternative, in the case of specified and/or automatic positioning of the components 1, 2 an automatic sequence of the drilling process could also be initiated without a template.

By way of example, in the embodiment shown three through-holes 3 uniformly spaced apart from one another are provided in each cross-sectional plane.

The through-holes 3 are formed by laser-drilling in the manner described in relation to the previous FIGS. 3A and B. To form conical entries to the through-holes for countersinking a rivet head, the laser beam is initially more heavily defocussed, and subsequently less and less so down to the desired hole diameter. The intensity of the laser beam always remains high enough to evaporate both the matrix material and the fibers of the fiber composite material.

Arrangements of this type for (semi-)automatically laser-drilling fiber composite components may be adapted to different desired hole diameters and to different component thicknesses. Thus, by comparison with a method according to FIG. 1 or 2A, much higher production speeds are possible, merely requiring a fraction of the time to manufacture the through-holes 3.

Further, arrangements of this type advantageously operate without any variation in the quality of the laser-drilled through-holes 3. By contrast, in mechanical drilling methods, as described in relation to FIGS. 1 and 2A, a drill loses sharpness and thus precision with continued use. This can be discerned in microscope images of the drilled holes by way of increased occurrence of drilling dust and unclean or rough surfaces.

Figure 4B:
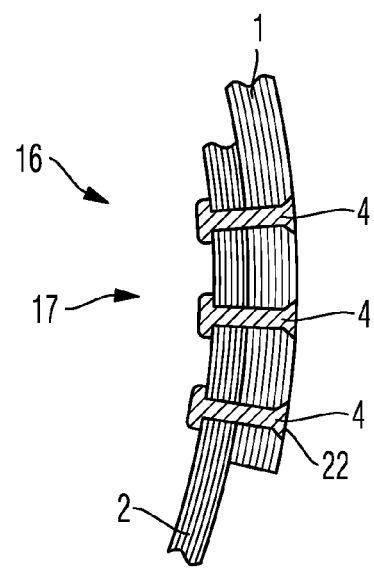
FIG. 4B is a cross-sectional view of a structural arrangement comprising a rivet connection of two fiber composite material components.

FIG. 4B is a cross-sectional view of a structural arrangement 16 comprising a rivet connection 17 of two fiber composite material components 1, 2.

The two components 1, 2 arranged in an overlap joint and provided with through-holes 3 by laser-drilling are connected by rivets 4, which are introduced into the through-holes 3 and subsequently fixed to the first component 1 and to the second component 2.

In this connection, it should in particular be noted that no additional cleaning step is required before the rivets 4 are introduced, since when the through-holes 3 are laser-drilled no drilling dust, in particular no carbon dust, occurs.

The fixing takes place in the manner conventional to a person skilled in the art, in particular by way of a positive connection provided on the rivet 4 by way of a rivet head at the entry face and a positive and non-positive connection provided by shaping at the exit face.

Figure 5:
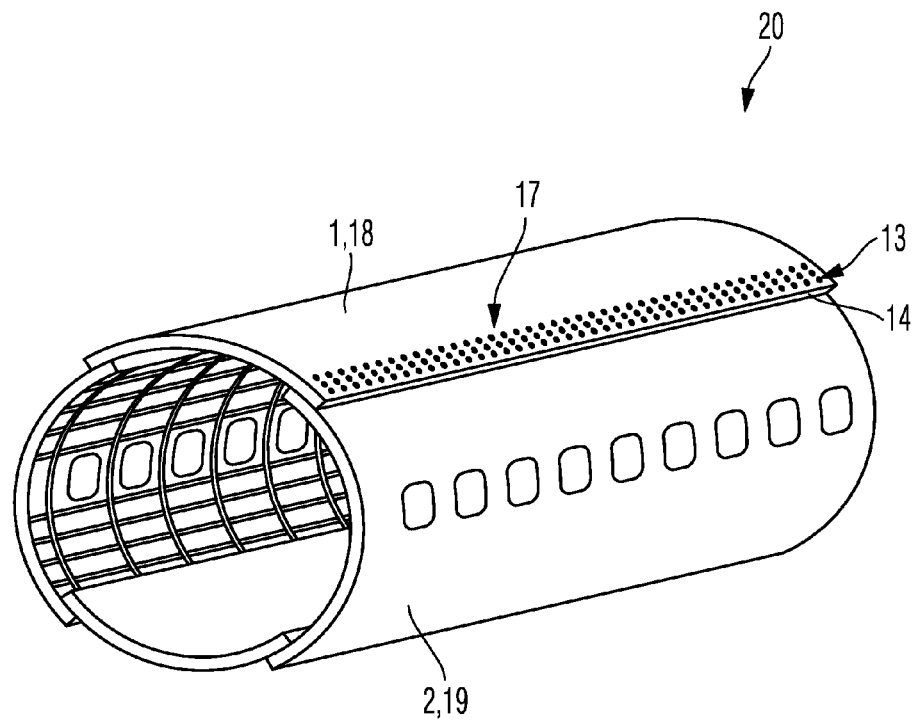
FIG. 5 is a perspective drawing of a fuselage portion of an aircraft or spacecraft.

FIG. 5 is a perspective view of a vehicle skin 20. In the embodiment shown, this is a vehicle skin 20 in the form of a fuselage portion of an aircraft or spacecraft.

The fuselage portion comprises a first skin portion 18 as the first component 1 and a second skin portion 19 as the second component 2. The two skin portions 18, 19 are arranged in an overlap joint with one another in the region of a rivet connection 17. A plurality of joint lines 13, typically three parallel joint lines, are provided parallel to an edge 14 of the first skin portion 18 by through-holes, each having an inserted and fixed rivet 4.

In total, the fuselage portion shown consists of or comprises by way of example four skin portions, which are each curved and which are arranged to form a tubular fuselage shape and interconnected in the same manner as the first skin portion 18 and the second skin portion 19.

Figure 6:
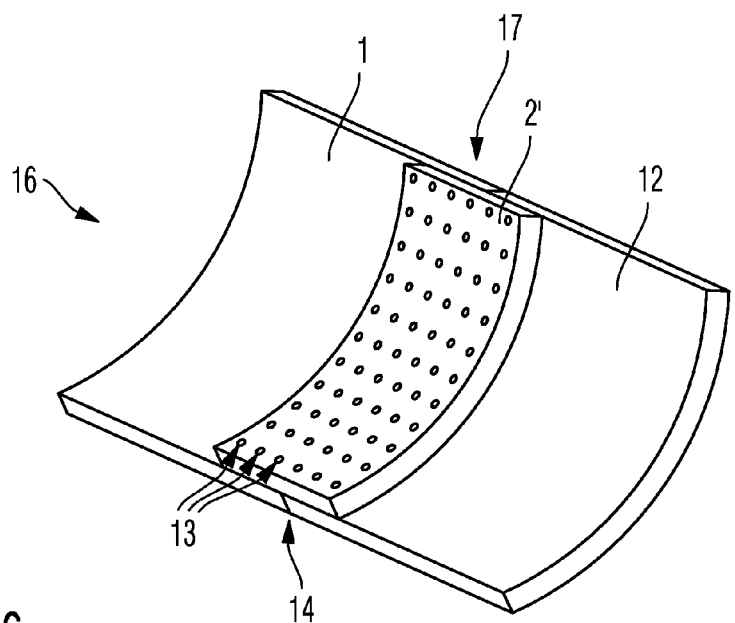
FIG. 6 is a perspective drawing of two fiber composite material components connected in a butt joint by a connecting portion.

FIG. 6 is a perspective view of two fiber composite material components 1, 12 connected in a butt joint by a connecting portion 2'.

This is a structural arrangement 16 comprising two components 1, 12 in a butt joint, which are connected via the connecting portion 2' using a rivet connection 17.

For this purpose, the first component 1 and a further component 12 are arranged with respect to one another and covered with a connecting portion 2' formed as a doubler in the region of the butt joint. The connecting portion 2' is arranged overlapping with each of the components 1, 12 and in each case connected by at least one joint line 13 of through holes 3, for example a plurality as shown here, in particular three, each having an inserted and fixed rivet 4.

Thus, in this embodiment, the connecting portion 2' formed as a doubler forms the second component arranged in an overlap joint with the first component 1 and connected by rivet connection.

In this case too, the joint lines 13 accordingly extend along an edge 14 of the first component 1.

Although the present disclosure has been described herein by way of several embodiments, it is not limited thereto, but can be modified in numerous ways.

For example, for different applications, a wide range of different types of rivets may be used, for example including hollow rivets, blind rivets, spread rivets or the like instead of solid rivets.

In one embodiment, it is conceivable to provide one of the components with pre-drilled holes, in such a way that the shared through-hole can only be produced through the fiber composite material of the other component by laser-drilling. Subsequently, the components can be riveted. In particular, holes of the pre-drilled component which are pre-drilled in this manner may be provided with countersinks for receiving a rivet head in a flush manner.

Instead of skin portions, the first and second components 1, 2 may be any type of structural component of a structural arrangement.

As an alternative to a fuselage for an aircraft or spacecraft, skin portions of other types of vehicle skins containing fiber composite components may be provided with a rivet connection 17 in the manner according to the disclosure herein, for example body parts of a motor vehicle or fuselage parts of a boat or ship.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a rivet connection of a fiber composite component, comprising:
    positioning a first component which contains a fiber composite material in an overlap joint with a second component;

laser-drilling a shared through-hole at least through the fiber composite material of the first component by at least one of single-pulse drilling, percussion drilling, trepanning or spiral drilling;

forming at least one conical entry to the through-hole using a laser beam that is initially widened or defocused, and subsequently less widened or less defocused;

inserting a rivet into the through-hole; and fixing the rivet to the first component and to the second component.

2. The method of claim 1, wherein the laser-drilling is carried out using a high-energy laser beam.

3. The method of claim 2, wherein the high-energy laser beam has a laser power greater than approximately 6 kilowatts.

4. The method of claim 1, wherein the second component contains a fiber composite material which is drilled through during the laser-drilling.

5. The method of claim 1, wherein the fiber composite material contains carbon fibers, some of which are partially drilled through by the laser-drilling.

6. The method of claim 1, wherein the laser beam is widened or defocused to produce a desired hole diameter.

7. The method of claim 1, wherein at least the first component is provided in planar form.

8. The method of claim 7, wherein a plurality of parallel joint lines are provided along an edge of the first component.

9. The method of claim 1, wherein a plurality of shared through-holes are formed in the first component and in the second component in a line extending along an edge of the first component by laser-drilling, a rivet being inserted into each of the through-holes and fixed to the first component and to the second component to form a uniformly continuous joint line.

10. The method of claim 9, wherein a plurality of parallel joint lines are provided along an edge of the first component.

11. A structural arrangement, comprising:

a first component which contains a fiber composite material and a second component, the first component and the second component being connected using a rivet connection manufactured by a method comprising:

positioning a first component which contains a fiber composite material in an overlap joint with a second component;

laser-drilling a shared through-hole at least through the fiber composite material of the first component by at least one of single-pulse drilling, percussion drilling, trepanning or spiral drilling;

inserting a rivet into the through-hole; and fixing the rivet to the first component and to the second component.

12. The structural arrangement of claim 11, wherein a through-hole of the rivet connection comprises a hole wall which comprises a surface which is manufactured without cutting.

13. The structural arrangement of claim 12, wherein the surface of the hole wall is manufactured by direct evaporation.

14. A method for manufacturing a vehicle skin, the method comprising:

providing a first component in a form of a first skin portion which contains a fiber composite material;

providing a second component in a form of a second skin portion or a connecting portion for connecting the first skin portion to a second skin portion in a butt joint; and connecting the first component to the second component using a rivet connection manufactured by a method comprising:

positioning a first component which contains a fiber composite material in an overlap joint with a second component;

laser-drilling a shared through-hole at least through the fiber composite material of the first component by at least one of single-pulse drilling, percussion drilling, trepanning or spiral drilling;

forming a conical entry on at least one side of the through-hole using the laser;

inserting a rivet into the through-hole; and fixing the rivet to the first component and to the second component.

15. A vehicle skin manufactured by a method comprising:

providing a first component in a form of a first skin portion which contains a fiber composite material;

providing a second component in a form of a second skin portion or a connecting portion for connecting the first skin portion to a second skin portion in a butt joint; and connecting the first component to the second component using a rivet connection manufactured by a method comprising:

positioning a first component which contains a fiber composite material in an overlap joint with a second component;

laser-drilling a shared through-hole at least through the fiber composite material of the first component by at least one of single-pulse drilling, percussion drilling, trepanning or spiral drilling;

inserting a rivet into the through-hole; and fixing the rivet to the first component and to the second component.

16. A method of using laser-drilling to manufacture a rivet connection of a fiber composite component, the method comprising:

positioning a first component which contains a fiber composite material in an overlap joint with a second component;

laser-drilling a shared through-hole at least through the fiber composite material of the first component by at least one of single-pulse drilling, percussion drilling, trepanning or spiral drilling;

focusing the laser from a wider focus to a narrower focus to form at least one conical entry to the through-hole for countersinking a rivet;

inserting a rivet into the through-hole in a flush manner; and fixing the rivet to the first component and to the second component.

17. The structural arrangement of claim 12, wherein the surface of the hole wall is covered with material directly solidified from a molten liquid state.

\* \* \* \* \*